(12) United States Patent
Tanaka et al.

(10) Patent No.: US 6,207,123 B1
(45) Date of Patent: Mar. 27, 2001

(54) PROCESS FOR PRODUCING SODIUM SALTS

(75) Inventors: Kunio Tanaka, Katakyusyu; Shintaro Kikuchi, Kitakyushu, both of (JP)

(73) Assignee: Asahi Glass Company, Ltd., Tokyo (JP)

(*) Notice: Subject to any disclaimer, the term of this patent is extended or adjusted under 35 U.S.C. 154(b) by 0 days.

(21) Appl. No.: 09/256,212

(22) Filed: Feb. 24, 1999

(30) Foreign Application Priority Data

Mar. 4, 1998 (JP) .................................. 10-052429

(51) Int. Cl.$^7$ ............................. C01D 7/00; C01D 7/14
(52) U.S. Cl. .................... 423/421; 423/425; 423/426; 423/206.2; 23/302 T
(58) Field of Search ............... 23/302 T; 423/206.2, 423/421, 422, 425, 426

(56) References Cited

U.S. PATENT DOCUMENTS

| | | | |
|---|---|---|---|
| 1,911,794 | * 5/1933 | Britton | 23/302 T |
| 3,273,958 | * 9/1966 | Peverley | 423/206.2 |
| 3,455,647 | * 7/1969 | Gloster | 423/206.2 |
| 3,486,844 | * 12/1969 | Tabler | 423/206.2 |
| 3,498,744 | * 3/1970 | Frint et al. | 423/206.2 |
| 4,202,667 | * 5/1980 | Conroy et al. | 23/302 T |
| 4,401,635 | * 8/1983 | Frint | 423/206.2 |
| 5,043,149 | * 8/1991 | Frint et al. | 423/206.2 |
| 5,238,664 | * 8/1993 | Frint et al. | 423/206.2 |
| 5,955,043 | * 9/1999 | Neuman et al. | 423/206.2 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

A process for producing sodium salts, which comprises adding solid sodium carbonate to a first aqueous solution containing sodium carbonate and sodium hydrogencarbonate, to prepare a second aqueous solution, precipitating, separating and recovering from the second aqueous solution sodium sesquicarbonate crystals containing at least 50 mol % of the sodium hydrogencarbonate component contained in the second aqueous solution, and further recovering sodium carbonate from a mother liquor remaining after separating the sodium sesquicarbonate crystals from the second aqueous solution.

15 Claims, 1 Drawing Sheet

F I G. 1
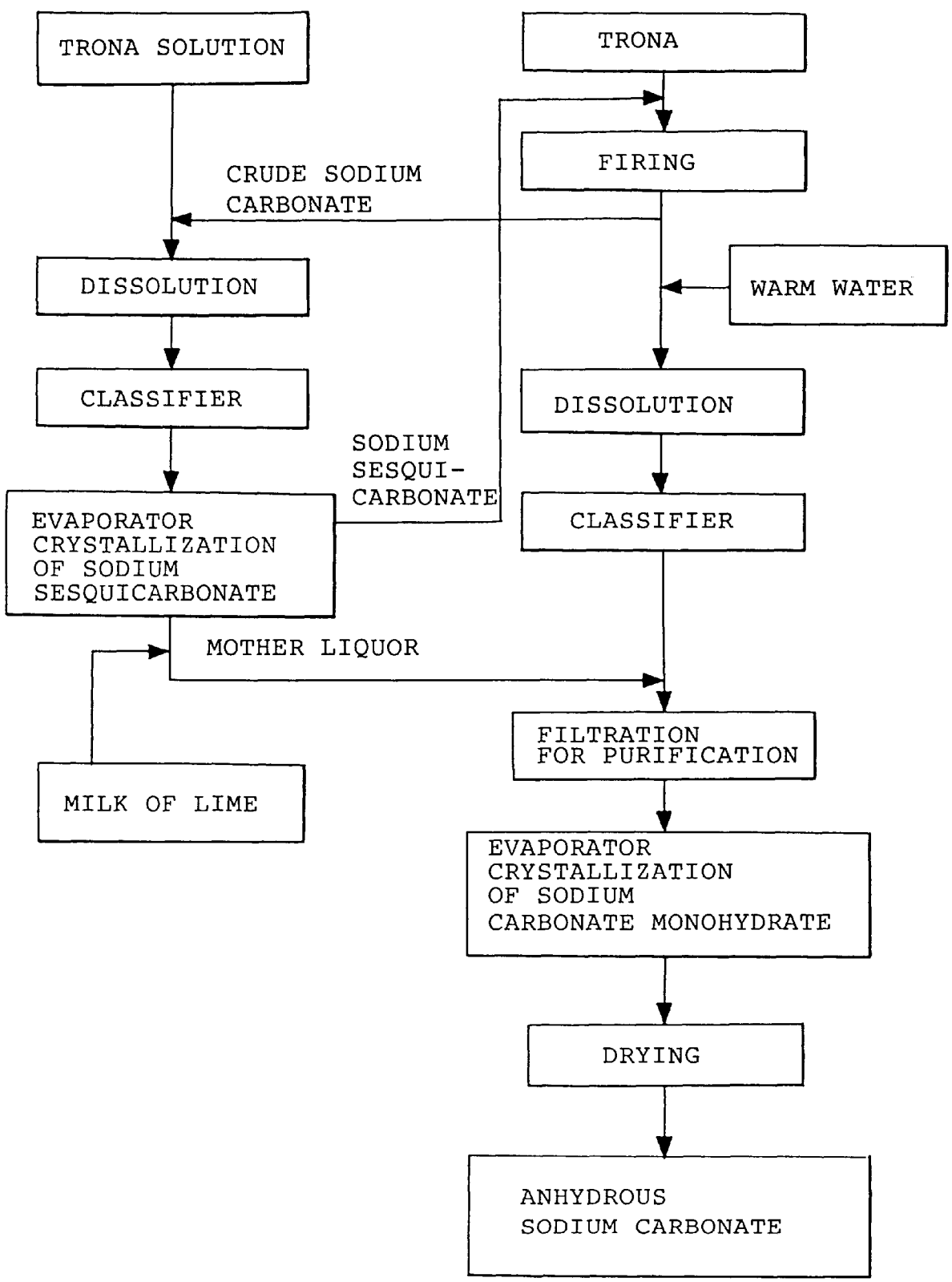

PROCESS FOR PRODUCING SODIUM SALTS

BACKGROUND OF THE INVENTION

Field of the Invention

The present invention relates to a process for producing sodium carbonate, particularly to a process for producing sodium carbonate, wherein trona is used as a starting material.

Discussion of the Background

As a typical example of natural sodium carbonate resource, trona is known which contains sodium sesquicarbonate ($Na_2CO_3 \cdot NaHCO_3 \cdot 2H_2O$) as the main component. For example, it is known that there is a large trona bed containing sodium sesquicarbonate in an amount of about 90 wt % in Green Liver, Wyo., U.S.A. Further, trona beds have been discovered also in e.g. Kenya, Tanzania, Turkey and China.

As a method for producing sodium carbonate from trona, it is most common to employ a method so-called a monohydrate crystallizing method. According to this method, firstly, trona is fired at an atmosphere temperature of from 400 to 800° C., whereby a sodium hydrogencarbonate content is converted to sodium carbonate, and at the same time, organic substances are decomposed and removed, to obtain crude sodium carbonate. This crude product is dissolved in water, then impurities are filtered off for purification, water is evaporated, and sodium carbonate monohydrate ($Na_2CO_3 \cdot H_2O$) is crystallized, separated and dried to obtain sodium carbonate. This method has a feature that it is thereby possible to obtain anhydrous sodium carbonate containing little organic substances and having a large bulk density (so-called dense ash).

Heretofore, as a method for mining trona, it has been common to employ a method of digging it out directly from the ground by means of a large size mining machine in the same manner as for e.g. coal. However, by this method, the cost required for mining constitutes as much as 30 to 40% of the cost for the production of sodium carbonate. Recently, attention has been drown to a mining method so-called a solution mining method in order to reduce the cost. The solution mining method is a system wherein water is poured into a trona bed, and the sodium sesquicarbonate component in the trona bed is pumped up in the form of a mixed solution of sodium carbonate and sodium hydrogencarbonate.

However, by the solution mining method, the alkali concentration in the pumped up solution is low, and it is necessary to evaporate a large amount of water from the solution in order to obtain the desired sodium carbonate. Therefore, as a method for efficiently recovering the alkali content from the solution having a low alkali content, there is a method wherein the solution is used to dissolve crude sodium carbonate in the monohydrate crystallizing method, or a method wherein sodium carbonate decahydrate ($Na_2CO_3 \cdot 10H_2O$) is crystallized in a low temperature range. In either method, a sodium hydrogencarbonate component and other impurities are contained in the solution obtained by dissolving trona, and it is necessary to remove such impurities.

As a method for converting the sodium hydrogencarbonate component to sodium carbonate, a method of reacting sodium hydroxide, calcium hydroxide or the like, a method of blowing steam thereto to discharge carbon dioxide gas, or a method of precipitating and separating it as sodium sesquicarbonate or sodium hydrogencarbonate, is, for example, known. However, by such a method, a large amount of sodium hydroxide or calcium hydroxide was required, and consumption of energy was substantial.

For example, in a case where milk of lime is added to a trona solution having the composition as identified in Table 1 (% means wt %) to have the sodium hydrogencarbonate content reacted and removed, followed by evaporating water to precipitate sodium carbonate monohydrate, 90 kg of milk of lime as calculated as CaO is required per ton of sodium carbonate produced.

TABLE 1

| | |
|---|---|
| $Na_2CO_3$ | 14.0% |
| $NaHCO_3$ | 4.50% |
| NaCl | 0.40% |
| $Na_2SO_4$ | 0.90% |

To overcome the above drawback, U.S. Pat. No. 5,283,054 discloses a carbon dioxide diffusion method. According to this method, an aqueous solution containing sodium carbonate and sodium hydrogencarbonate is heated to change a part of the sodium hydrogencarbonate to sodium carbonate, and then an aqueous sodium hydroxide solution is added in an amount sufficient to convert the rest of the sodium hydrogencarbonate to sodium carbonate, followed by cooling to precipitate and separate sodium carbonate decahydrate. This sodium carbonate decahydrate is dissolved in water and then precipitated this time as sodium carbonate monohydrate, and finally anhydrous sodium carbonate is obtained.

SUMMARY OF THE INVENTION

It is an object of the present invention to provide a novel process whereby sodium carbonate can be efficiently produced from e.g. a natural trona bed, with small consumption of sodium hydroxide or calcium hydroxide and with a low energy consumption.

The present invention provides a process for producing sodium salts, which comprises adding solid sodium carbonate to a first aqueous solution comprising sodium carbonate and sodium hydrogencarbonate, to prepare a second aqueous solution, precipitating, separating and recovering from the second aqueous solution sodium sesquicarbonate crystals containing at least 50 mol % of the sodium hydrogencarbonate component contained in the second aqueous solution, and further recovering sodium carbonate from a mother liquor remaining after separating the sodium sesquicarbonate crystals from the second aqueous solution.

BRIEF DESCRIPTION OF THE DRAWING

FIG. 1 is a flow chart illustrating the practical process of the present invention.

DETAILED DESCRIPTION OF THE PREFERRED EMBODIMENTS

In the present invention, the first aqueous solution is an aqueous solution containing sodium carbonate and sodium hydrogencarbonate, it is preferably an aqueous solution obtained by dissolving trona. The aqueous solution obtained by dissolving trona includes not only an aqueous solution prepared by dissolving in water trona obtained in a solid state by mining, but also a solution obtained by injecting water to a trona bed in the ground, contacting it with the trona bed and then pumping it up from the ground. Namely, it includes a solution of trona obtained by a solution mining method. When water is injected into the trona bed, a waste liquid containing a sodium content, discharged from the plant for producing sodium carbonate from trona, may be returned to the trona bed, and a part of a waste liquid contacted with the trona may be recovered and used. Such use of the waste liquid from the plant for producing sodium carbonate, may contribute to improvement of the recovery ratio of sodium as the entire trona bed.

In the present invention, the solid sodium carbonate to be added to the first aqueous solution is preferably a sodium carbonate obtained by firing trona or a mixture of trona with a material containing other sodium carbonate component. In this specification, solid sodium carbonate prepared in such a manner will be referred to as crude sodium carbonate.

According to present invention, it is possible to produce a sodium salt such as sodium carbonate further efficiently as compared with conventional methods, by combining e.g. a trona solution obtainable by a solution mining method with solid trona, as starting materials.

The present invention is characterized in that at least 50 mol % of the sodium hydrogencarbonate component contained in the second aqueous solution is precipitated and separated as sodium sesquicarbonate crystals from the second aqueous solution. The sodium hydrogencarbonate component separated from the second aqueous solution as sodium sesquicarbonate crystals is more preferably at least 80 mol %. It is particularly preferred that the sodium hydrogencarbonate component separated is at least 90 mol %.

The sodium sesquicarbonate crystals separated from the second aqueous solution are directly fired to obtain anhydrous sodium carbonate. Otherwise, the separated sodium sesquicarbonate crystals may be mixed with e.g. trona, and the mixture may be fired to obtain crude sodium carbonate. It is preferred that from this crude sodium carbonate, sodium carbonate is recovered, for example, by a method similar to the conventional monohydrate crystallizing method. Namely, sodium carbonate monohydrate is precipitated and separated from an aqueous solution obtained by dissolving the crude sodium carbonate in water, and crystals of this sodium carbonate monohydrate are dehydrated to obtain anhydrous sodium carbonate.

The sodium sesquicarbonate crystals precipitated from the second aqueous solution are slender needle-like crystals. Accordingly, sodium carbonate obtainable by firing such sodium sesquicarbonate crystals will be a bulky product so-called light ash, and such a bulky product is not suitable as a starting material for the production of glass. Further, the second aqueous solution contains impurities which are contained in the trona solution or in the crude sodium carbonate. Accordingly, if the impurities are not adequately removed from the second aqueous solution, the sodium sesquicarbonate crystals will also contain a large amount of impurities. Accordingly, the sodium sesquicarbonate crystals obtained here, are preferably mixed with trona and converted to crude sodium carbonate for use.

Various methods may be employed for recovering sodium carbonate from the mother liquor remaining after separating the sodium sesquicarbonate crystals from the second aqueous solution. However, a method is preferred wherein sodium carbonate monohydrate is precipitated and separated from this mother liquor, and this sodium carbonate monohydrate is dried to obtain anhydrous sodium carbonate. It is particularly preferred that the mother liquor is mixed with an aqueous solution obtained by dissolving the crude sodium carbonate obtained by firing trona, and sodium carbonate is recovered, for example, by a method similar to the conventional monohydrate crystallizing method.

In such a case, it is preferred that sodium hydroxide or calcium hydroxide is added to the mother liquor after separating sodium sesquicarbonate crystals from the second aqueous solution, to convert hydrogencarbonate ions to carbonate ions, and then sodium carbonate monohydrate is precipitated and separated. If hydrogencarbonate ions are present in the mother liquor remaining after separating the sodium sesquicarbonate crystals, sodium hydrogencarbonate or sodium sesquicarbonate crystals are likely to be included when crystals of sodium carbonate monohydrate are obtained. Accordingly, the physical property of anhydrous sodium carbonate obtained by dehydrating such crystals, tends to be bulky, whereby the flowability tends to be poor, and the proportion of fine particles contained in the anhydrous sodium carbonate tends to be large. The concentration of sodium hydrogencarbonate in the mother liquor remaining after separating the sodium sesquicarbonate crystals from the second aqueous solution, is preferably from 0.1 to 1.5 wt % as calculated as $NaHCO_3$. The concentration of sodium hydrogencarbonate in the mother liquor is more preferably from 0.2 to 1.0 wt % as calculated as $NaHCO_3$.

According to the process of the present invention, at least 50 mol % of the sodium hydrogencarbonate component in the second aqueous solution, is separated as sodium sesquicarbonate crystals out of the mother liquor. Accordingly, the amount of sodium hydroxide or calcium hydroxide can be reduced correspondingly. By increasing the amount of precipitation of the sodium sesquicarbonate crystals, it is possible to reduce the amount of sodium hydrogencarbonate component to a range where no addition of sodium hydroxide or calcium hydroxide is required.

Now, the process of the present invention will be described in accordance with the flow chart shown in FIG. 1. In FIG. 1, a trona solution having a trona component dissolved in an amount close to saturation, is used as the first aqueous solution containing sodium carbonate and sodium hydrogencarbonate, and crude sodium carbonate obtained by firing trona, is used as the solid sodium carbonate. Further, the sodium sesquicarbonate crystals separated from the second aqueous solution are mixed in their entire amount with trona and used as converted to crude sodium carbonate.

As the trona solution, various types as mentioned above may be employed. However, one having a high concentration and a high temperature, is preferred. The composition is preferably such that the concentration of sodium carbonate is from 5 to 20 wt % as calculated as $Na_2CO_3$ and the concentration of sodium hydrogencarbonate is from 2 to 6 wt % as calculated as $NaHCO_3$. Hereinafter, with respect to the composition of the solution, the concentration of sodium carbonate will be represented by the concentration as calculated as $Na_2CO_3$, and the concentration of sodium hydrogencarbonate will be represented by the concentration as calculated as $NaHCO_3$. A more preferred composition of the trona solution is such that $Na_2CO_3$ is from 10 to 15 wt %, and $NaHCO_3$ is from 3 to 5 wt %. Further, one containing little soluble impurities such as NaCl and $Na_2SO_4$, is preferred.

To such a trona solution, crude sodium carbonate is dissolved. The composition of the second aqueous solution obtained by dissolving the crude sodium carbonate is preferably such that $Na_2CO_3$ is from 23 to 30 wt %, and $NaHCO_3$ is from 1 to 5 wt %. More preferred ranges are such that $Na_2CO_3$ is from 25 to 28 wt %, and $NaHCO_3$ is from 2 to 4 wt %. As a condition at the time of dissolution, the liquid temperature is preferably from 60 to 90° C., more preferably from 70 to 80° C.

The second aqueous solution thereby obtained, contains a non-dissolved residue contained in the crude sodium carbonate, and it is preferred to remove such a residue before sending the second aqueous solution to the subsequent step. For the removal of the non-dissolved residue, a rake classifier, a spiral classifier or a decanter may, for example, be employed.

This aqueous solution is then supplied to an evaporator, where a part of water will be removed. Here, if the temperature of the second aqueous solution is high, it is likely that sodium carbonate monohydrate will precipitate together with sodium sesquicarbonate. Therefore, the temperature is preferably maintained at a level of from 30 to 60° C. If sodium carbonate monohydrate will precipitate, the concentration of sodium carbonate in the mother liquor will decrease correspondingly, and the yield of sodium carbonate recovered from the mother liquor will decrease, such being undesirable. Specifically, water is removed while preventing precipitation of sodium carbonate monohydrate at a temperature of about 60° C. under reduced pressure, and then the liquid temperature is lowered to a level of from 35 to 40° C. to precipitate sodium sesquicarbonate. When crystallization of sodium sesquicarbonate is carried out continuously, it is preferred to carry out the operation under a reduced pressure of from 40 to 130 torr, while maintaining the temperature at a level of from 35 to 40° C. where the solubility of sodium carbonate is high.

As the evaporator, a circulation type reduced pressure evaporator is referred. Specifically, a circulation type reduced pressure evaporator equipped with a barometric condenser and an ejector or a vacuum pump and having internally a draft tube, is preferably employed. It is also possible to use a normal pressure air-blowing type evaporator.

The precipitated sodium sesquicarbonate crystals are separated from the mother liquor by means of a vacuum type oliver filter or a centrifugal filter. In the method as illustrated in the flow chart of FIG. 1, the separated sodium sesquicarbonate crystals are mixed with trona and converted to crude sodium carbonate for further use.

The composition of the mother liquor remaining after separating the sodium sesquicarbonate crystals is preferably such that $Na_2CO_3$ is from 30 to 33 wt %, and $NaHCO_3$ is from 0.1 to 1.5 wt %. More preferably, $Na_2CO_3$ is from 31 to 32 wt %, and $NaHCO_3$ is from 0.2 to 1.0 wt %. According to the present invention, sodium carbonate obtained by firing trona, is dissolved in the trona solution, whereby a thick sodium carbonate solution can be obtained, and precipitation of sodium sesquicarbonate crystals can be carried out efficiently with a small amount of water evaporated. As a result, a solution having a small content of sodium hydrogencarbonate, can be obtained as the mother liquor remaining after separating the sodium sesquicarbonate crystals.

In a case where a sodium hydrogencarbonate component remains in the mother liquor remaining after separating the sodium sesquicarbonate, it is preferred to add sodium hydroxide or calcium hydroxide to convert the sodium hydrogencarbonate component in the mother liquor to sodium carbonate. The sodium hydroxide is added preferably in the form of an aqueous solution, and the calcium hydroxide is added preferably in the form of so-called milk of lime. The amount to be added is preferably such that the sodium hydrogencarbonate component in the solution after the addition will be not higher than 0.5 wt %, preferably not higher than 0.2 wt %. The amount of addition can be controlled by measuring the pH. When the liquid temperature is 40° C., the pH is preferably within a range of from 11.2 to 12.0, more preferably from 11.4 to 11.8.

Now, the flow on the right hand side in FIG. 1 will be described. In this example, a method similar to the conventional monohydrate crystallizing method is employed.

Trona and the sodium sesquicarbonate crystals separated in the above described process (the flow on the left hand side) are mixed and fired. For the firing, it is preferred to employ a hot air-blowing type thermal decomposition furnace, particularly an agitation type decomposition furnace of a rotary furnace type or fluidized bed type. It is preferred to employ a hot air formed by combustion of a fuel having a low sulfur content. Specifically, a direct combustion type rotary furnace is preferred which uses natural gas as the fuel. With respect to the firing conditions, the temperature of the material to be heated is preferably from 120 to 250° C., more preferably from 160 to 200° C., and the residence time is preferably at least 20 minutes, more preferably at least 40 minutes.

In this firing step, the sodium sesquicarbonate component in the trona will be converted substantially in its entirety to sodium carbonate. Further, volatile impurities such as organic substances will be removed. If the temperature during the firing is low, removal of impurities in the trona is likely to be incomplete, such being undesirable. On the other hand, if the temperature is high, sodium silicate is likely to be formed, and consequently, the silicate content in sodium carbonate is likely to increase.

The obtained crude sodium carbonate is dissolved in water to obtain a sodium carbonate solution which is close to a saturated solution. Here, the temperature of the aqueous sodium carbonate solution is preferably high so as to reduce the energy required for evaporation of water in the subsequent step. However, if the temperature is too high, handling tends to be difficult. Accordingly, the temperature is preferably from 70 to 90° C., more preferably from 82 to 88° C. The concentration is preferably as close as possible to saturation. However, to obtain a saturated solution in a practical operation, a long time will be required. Accordingly, the concentration is preferably from 29 to 31 wt % as the concentration of $Na_2CO_3$.

The obtained solution contains a non-dissolved residue contained in the crude sodium carbonate, and it is preferred to remove such a non-dissolved residue before sending the solution to the subsequent step. For removal of the non-dissolved residue, a rake classifier, a spiral classifier or decanter can, for example, be employed.

The sodium carbonate solution thus obtained, is mixed with the mother liquor remaining after separating the sodium sesquicarbonate crystals. It is preferred to further remove from this mixed solution insoluble suspended impurities and soluble impurities by precipitation. For the purpose of accelerating the precipitation, it is preferred to add a coagulant in an amount of from 1 to 100 ppm. For the purpose of removing soluble impurities together with the insoluble floating impurities, it is preferred to add powdery active carbon, followed by filtration. As the filtration apparatus, a vacuum filtration apparatus may be employed. However, the vacuum filtration apparatus tends to lower the temperature as it sucks air in. Accordingly, a pressure filtration apparatus is preferred. Specifically, a filter press type filtration apparatus, a leaf filter type filtration apparatus or a sand filter type filtration apparatus may, for example, be mentioned.

At the time of the filtration, it is preferred to use a filter aid to improve the filtration rate while suppressing clogging of the filter cloth. As such a filter aid, diatomaceous earth or pearlite is preferred. A method of using a filter aid may be a precoat method or a body feed method. Otherwise, it is preferred to use them in combination.

The sodium carbonate solution having impurities removed, is then sent to an evaporation crystallizer and crystallized as sodium carbonate monohydrate. As the apparatus for crystallizing the sodium carbonate monohydrate, a multi effect evaporation crystallizer or a mechanical evaporated-vapor recompression crystallizer may, for example, be employed.

The precipitated sodium carbonate monohydrate is separated by e.g. a centrifugal separator or a vacuum evacuation type oliver filter or a belt filter and then dried to obtain anhydrous sodium carbonate.

The drying is carried out by using e.g. a rotary furnace type steam tube drier, a rotary drier of a type wherein a hot air formed by combustion of e.g. natural gas is blown thereinto, a fuelized bed drier or an air-circulation drier under such conditions that the temperature of the material to be dried is preferably from 120 to 250° C., more preferably from 160 to 200° C., and the residence time is preferably at least 20 minutes, more preferably at least 30 minutes.

The mother liquor remaining after separating the sodium carbonate monohydrate, is preferably re-cycled to the step for crystallizing sodium carbonate monohydrate. However, since $Na_2SO_4$, NaCl, $SiO_2$, organic substances, etc. contained in the sodium carbonate solution will be concentrated in the evaporation crystallizer, it is preferred to partially purge the super natant in the crystallizer for the purpose of obtaining sodium carbonate monohydrate crystals of high purity. The amount of the purge is adjusted by controlling the concentrations of impurities in the crystallizer. With respect to the concentrations of impurities in the sodium carbonate solution in the evaporation crystallizer, the $Na_2SO_4$ concentration is preferably not higher than 2.5 wt %, particularly preferably not higher than 1.5 wt %, and the concentration of organic substances is preferably not more than 100 ppm, particularly preferably not more than 500 ppm.

The sodium carbonate obtainable in this step is anhydrous sodium carbonate having a high purity and a large apparent specific gravity (so-called dense ash), and it is of a quality which adequately satisfies the standard for a glass material as the main application of sodium carbonate.

Now, the present invention will be described in further detail with reference to Examples. However, it should be understood that the present invention is by no means restricted to such specific Examples.

EXAMPLE

Using trona produced in Green Liver, Wyo., U.S.A., production of sodium carbonate was carried out. The composition of this trona was as shown in Table 2. In this Example, "%" is "wt %" in all cases.

TABLE 2

| | |
|---|---|
| $Na_2CO_3 \cdot NaHCO_3 \cdot 2H_2O$ | 95.7% |
| NaCl | 0.20% |
| $Na_2SO_4$ | 0.03% |

TABLE 2-continued

| | |
|---|---|
| Organic Substances | 0.20% |
| Insoluble Impurities | 3.65% |

Firstly, this trona was fired with stirring for one hour at a temperature of the heated material of 200° C., to obtain crude sodium carbonate containing sodium carbonate as the main component. The composition of this crude sodium carbonate was as shown in Table 3.

TABLE 3

| | |
|---|---|
| $Na_2CO_3$ | 95.4% |
| NaCl | 0.25% |
| $Na_2SO_4$ | 0.04% |
| Organic Substances | 0.01% |
| Insoluble Impurities | 4.25% |

2.6 kg of this crude sodium carbonate was dissolved in 10l (about 11.4 kg) of a solution having the composition as identified in Table 4, which was obtained by sufficiently contacting water and trona, and the temperature was raised to 80° C.

TABLE 4

| | |
|---|---|
| $Na_2CO_3$ | 10.1% |
| $NaHCO_3$ | 5.63% |
| NaCl | 0.014% |
| $Na_2SO_4$ | 0.004% |

The composition of a solution after removing about 280 g of a non-dissolved residue precipitated at the bottom, from the solution after dissolution, was as shown in Table 5.

TABLE 5

| | |
|---|---|
| $Na_2CO_3$ | 26.1% |
| $NaHCO_3$ | 4.06% |
| NaCl | 0.051% |
| $Na_2SO_4$ | 0.011% |

Then, 13.7 kg of the solution of Table 5 was subjected to evaporation of water in an amount of 2.8 kg under reduced pressure at a temperature of 60° C. and then cooled to 40° C. to precipitate sodium sesquicarbonate crystals. Then, crystals were separated to obtain 2.5 kg of a solid having the composition as identified in Table 6. Further, this solid was fired to obtain 1.24 kg of anhydrous sodium carbonate.

TABLE 6

| | |
|---|---|
| $Na_2CO_3 \cdot NaHCO_3 \cdot 2H_2O$ | 72.6% |
| $Na_2CO_3 \cdot H_2O$ | 8.49% |
| NaCl | 0.06% |
| $Na_2SO_4$ | 0.006% |
| Attached Water | 18.1% |
| Insoluble Impurities | 0.74% |

The composition of the mother liquor remaining after separating the sodium sesquicarbonate crystals, was as shown in Table 7. By the separation of the sodium sesquicarbonate crystals, 97% of the sodium hydrogencarbonate component in the solution was removed.

TABLE 7

| | |
|---|---|
| $Na_2CO_3$ | 30.6% |
| $NaHCO_3$ | 0.22% |
| NaCl | 0.070% |
| $Na_2SO_4$ | 0.015% |

To 8.4 kg of the mother liquor remaining after separating the sodium sesquicarbonate crystals, 90 g of a 10% sodium hydroxide solution was added. The composition of the solution after the addition was as shown in Table 8.

TABLE 8

| | |
|---|---|
| $Na_2CO_3$ | 30.5% |
| $NaHCO_3$ | 0.00% |
| NaCl | 0.069% |
| $Na_2SO_4$ | 0.015% |

This solution was mixed with a 31% solution obtained by dissolving in water the anhydrous sodium carbonate obtained by firing the crystals obtained by separation and having the composition as identified in Table 5, whereupon impurities were removed by filtration, and then water was evaporated to obtain crystals of sodium carbonate monohydrate.

The crystals were washed and then fired to obtain 3.8 kg of anhydrous sodium carbonate.

According to the process of the present invention, sodium carbonate can be produced efficiently from a trona solution and trona, with low consumption of energy and with a small amount of alkali for neutralization. Further, even from a trona solution having a low concentration, the sodium carbonate component can be recovered almost completely.

What is claimed is:

1. A process for producing sodium salts, which comprises:
   a) adding solid sodium carbonate to a first aqueous solution containing sodium carbonate and sodium hydrogencarbonate, to prepare a second aqueous solution;
   b) precipitating, separating and recovering from the second aqueous solution sodium sesquicarbonate crystals containing at least 50 mol % of the sodium hydrogencarbonate component contained in the second aqueous solution; and
   c) further recovering sodium carbonate monohydrate from a mother liquor remaining after separating the sodium sesquicarbonate crystals from the second aqueous solution and drying said sodium carbonate monohydrate to obtain anhydrous sodium carbonate;
   wherein the sodium carbonate monohydrate is recovered in step c) by forming a mixed aqueous solution comprising said mother liquor and an aqueous solution obtained by dissolving solid sodium carbonate obtained by firing trona, and precipitating, separating and recovering the sodium carbonate monohydrate from the mixed aqueous solution.

2. The process for producing sodium salts according to claim 1, wherein the first aqueous solution is an aqueous solution obtained by dissolving trona.

3. The process for producing sodium salts according to claim 1, wherein the solid sodium carbonate which is added to the first aqueous solution is sodium carbonate obtained by firing trona.

4. The process for producing sodium salts according to claim 1, wherein the sodium sesquicarbonate crystals recovered in step b) are fired to obtain anhydrous sodium carbonate.

5. The process for producing sodium salts according to claim 1, wherein the process further comprises the steps of mixing the sodium sesquicarbonate crystals recovered in step b) with trona, firing the resulting mixture to obtain crude sodium carbonate, dissolving the crude solid sodium carbonate to obtain an aqueous solution, precipitating and separating sodium carbonate monohydrate from the aqueous solution, and dehydrating the resulting sodium carbonate monohydrate to obtain anhydrous sodium carbonate.

6. The process for producing sodium salts according to claim 1, wherein sodium hydroxide or calcium hydroxide is added to the mother liquor remaining after separating the sodium sesquicarbonate crystals from the second aqueous solution before the mother liquor is mixed with the aqueous solution obtained by dissolving solid sodium carbonate obtained by firing trona.

7. The process for producing sodium salts according to claim 1, wherein in the second aqueous solution, sodium carbonate is contained in an amount of from 23 to 30 wt % as calculated as $Na_2CO_3$, and sodium hydrogencarbonate is contained in an amount of from 1 to 5 wt % as calculated as $NaHCO_3$.

8. The process for producing sodium salts according to claim 1, wherein sodium hydrogencarbonate contained in the mother liquor remaining after separating the sodium sesquicarbonate from the second aqueous solution is from 0.1 to 1.5 wt % as calculated as $NaHCO_3$.

9. The process for producing sodium salts according to claim 1, wherein said sodium sesquicarbonate crystals precipitated, separated and recovered from the second aqueous solution contain at least 80 mol % of the sodium hydrogencarbonate component contained in the second aqueous solution.

10. The process for producing sodium salts according to claim 9, wherein said sodium sesquicarbonate crystals precipitated, separated and recovered from the second aqueous solution contain at least 90 mol % of the sodium hydrogencarbonate component contained in the second aqueous solution.

11. The process for producing sodium salts according to claim 8, wherein the sodium hydrogencarbonate contained in the mother liquor remaining after separating the sodium sesquicarbonate from the second aqueous solution is from 0.2 to 1.0 wt. % as calculated as $NaHCO_3$.

12. The process for producing sodium salts according to claim 2, wherein the first aqueous solution obtained by dissolving trona has a concentration of sodium carbonate in the solution of from 5 to 20 wt. % as calculated as $Na_2CO_3$.

13. The process for producing sodium salts according to claim 12, wherein the first aqueous solution has a concentration of sodium carbonate of from 10 to 15 wt. % and of sodium hydrogencarbonate of from 3 to 5 wt. %.

14. The process for producing sodium salts according to claim 1, wherein said solid sodium carbonate is added to said first aqueous solution containing sodium carbonate and sodium hydrogencarbonate such that at dissolution the aqueous solution has a temperature of from 60 to 90° C.

15. The process for producing sodium salts according to claim 14, wherein at the time of dissolution the aqueous solution has a temperature of from 70 to 80° C.

* * * * *